(12) United States Patent
Hossain et al.

(10) Patent No.: US 12,443,363 B2
(45) Date of Patent: Oct. 14, 2025

(54) HIGH BANDWIDTH EXTENDED MEMORY IN A PARALLEL PROCESSING SYSTEM

(71) Applicant: NVIDIA CORPORATION, Santa Clara, CA (US)

(72) Inventors: Hemayet Hossain, San Jose, CA (US); Steven E. Molnar, Chapel Hill, NC (US); Jonathon Stuart Ramsay Evans, Santa Clara, CA (US); Wishwesh Anil Gandhi, Sunnyvale, CA (US); Lacky V. Shah, Los Altos Hills, CA (US); Vyas Venkataraman, Sharon, MA (US); Mark Hairgrove, San Jose, CA (US); Geoffrey Gerfin, San Jose, CA (US); Jeffrey M. Smith, Barrington, RI (US); Terje Bergstrom, San Jose, CA (US); Vikram Sethi, Austin, TX (US); Piyush Patel, Cary, NC (US)

(73) Assignee: NVIDIA CORPORATION, Santa Clara, CA (US)

( * ) Notice: Subject to any disclaimer, the term of this patent is extended or adjusted under 35 U.S.C. 154(b) by 99 days.

(21) Appl. No.: 17/698,409

(22) Filed: Mar. 18, 2022

(65) Prior Publication Data
US 2023/0315328 A1 Oct. 5, 2023

(51) Int. Cl.
*G06F 3/06* (2006.01)
(52) U.S. Cl.
CPC .......... *G06F 3/0655* (2013.01); *G06F 3/0604* (2013.01); *G06F 3/0679* (2013.01)
(58) Field of Classification Search
CPC ..... G06F 3/0604; G06F 3/0655; G06F 3/0679
See application file for complete search history.

(56) References Cited

U.S. PATENT DOCUMENTS

| | | | |
|---|---|---|---|
| 9,569,348 B1* | 2/2017 | Deming | G06F 12/00 |
| 2011/0270945 A1* | 11/2011 | Shiga | G06F 3/067 |
| | | | 709/213 |
| 2013/0305009 A1* | 11/2013 | Durant | G06F 9/5016 |
| | | | 711/170 |
| 2016/0378674 A1* | 12/2016 | Cheng | G06F 12/1072 |
| | | | 711/206 |
| 2017/0185514 A1* | 6/2017 | Blinzer | G06F 12/0815 |

(Continued)

OTHER PUBLICATIONS

P. Markthub, M. E. Belviranli, S. Lee, J. S. Vetter and S. Matsuoka, "DRAGON: Breaking GPU Memory Capacity Limits with Direct NVM Access," SC18: International Conference for High Performance Computing, Networking, Storage and Analysis, Dallas, TX, USA, 2018, pp. 414-426, doi: 10.1109/SC.2018.00035. (Year: 2018).*

*Primary Examiner* — Eric T Oberly
(74) *Attorney, Agent, or Firm* — Squire Patton Boggs LLP; Sarah Mirza

(57) ABSTRACT

Various embodiments include techniques for accessing extended memory in a parallel processing system via a high-bandwidth path to extended memory residing on a central processing unit. The disclosed extended memory system extends the directly addressable high-bandwidth memory local to a parallel processing system and avoids the performance penalties associated with low-bandwidth system memory. As a result, execution threads that are highly parallelizable and access a large memory space execute with increased performance on a parallel processing system relative to prior approaches.

21 Claims, 9 Drawing Sheets

(56) References Cited

U.S. PATENT DOCUMENTS

| | | | |
|---|---|---|---|
| 2018/0074966 A1* | 3/2018 | Cheng | G06F 12/109 |
| 2020/0183842 A1* | 6/2020 | Kahle | G06F 9/466 |
| 2021/0374063 A1* | 12/2021 | Jeong | G06F 12/0238 |
| 2022/0114096 A1* | 4/2022 | Striramassarma | G06F 17/16 |
| 2023/0144693 A1* | 5/2023 | Wang | G06F 13/1668 |
| | | | 711/154 |

* cited by examiner

HIGH BANDWIDTH EXTENDED MEMORY IN A PARALLEL PROCESSING SYSTEM

BACKGROUND

Field of the Various Embodiments

Various embodiments relate generally to parallel processing compute architectures and, more specifically, to high bandwidth extended memory in a parallel processing system.

Description of the Related Art

A computing system generally includes, among other things, one or more processing units, such as central processing units (CPUs) and/or graphics processing units (GPUs), and one or more memory systems. In general, the CPU functions as the master processor of the computing system, controlling and coordinating operations of other system components such as the GPUs. The CPU often has access to a large amount of low bandwidth system memory. GPUs, on the other hand, often have access to a smaller amount of high bandwidth local memory. As a result, the CPU is able to accommodate application programs that consume a large amount of memory and do not require high bandwidth from the memory. GPUs, on the other hand, are able to accommodate processes that consume a smaller amount of memory and require high bandwidth from the memory. In particular, GPUs are capable of executing a large number (e.g., hundreds or thousands) of threads concurrently, where each thread is an instance of an independent sequence of instructions. As a result, GPUs are well suited for parallelizable threads that benefit from high bandwidth memory to achieve high performance for specific tasks.

Certain threads are highly parallelizable, and therefore well suited for execution on one or more GPUs. These threads, however, can often access more memory than a GPU can directly address. Examples of such threads include recommender systems (that suggest relevant items for specific users), PageRank systems (that measure the importance of each node in a data graph based on relationships and connections among the nodes), data science and analytics systems, and other systems that utilize large in-memory databases. Such threads are well suited to execute on thousands of processors implemented on one or more GPUs. However, these threads may access databases that occupy significantly more memory space than the amount of memory the GPU is configured to access.

One approach for executing such threads on a GPU is to configure the threads so that most of the data resides in system memory. The data is loaded, or "paged-in," from the system memory to the GPU local memory and stored back, or "paged out," to system memory as needed. However, because the GPU to system memory bandwidth is low, paging data in and out of GPU local memory is slow relative to accessing GPU local memory, thereby significantly reducing GPU performance.

Another approach for executing such threads on a GPU is to utilize a portion of the GPU local memory of one or more other GPUs via a high-speed bus that interconnects the GPUs. The data can be paged-in from the local memory of one or more other GPUs to the GPU local memory and paged out to the local memory of the other GPU(s) as needed. Alternatively, the GPU can directly access the data stored in local memory of one or more other GPUs over a communications network. As a result, a GPU may increase the amount of high bandwidth memory available to the threads. One drawback of this approach is that the amount of additional high-bandwidth memory available from other GPUs is relatively limited, as compared with lower-bandwidth system memory. As a result, the GPU may still have insufficient high-bandwidth memory to execute an application efficiently, even after the GPU allocates high-bandwidth memory from one or more other GPUs. Another drawback of this approach is that when a first GPU is allocated a portion of memory from a second GPU, the memory accessible by the second GPU is correspondingly reduced. After the allocation, the first GPU may now execute threads with a sufficient amount of high-bandwidth memory, the second GPU may not be able to execute threads with a sufficient amount of high-bandwidth memory leading to reduced performance of the second GPU.

As the foregoing illustrates, what is needed in the art are more effective techniques for accessing extended memory in a parallel processing system.

SUMMARY

Various embodiments of the present disclosure set forth a method for accessing memory in a parallel processing system, such as a GPU, that is attached to a central processing unit. The method includes receiving a memory access from the parallel processing system. The method further includes determining that the memory access is directed towards an extended memory associated with the central processing unit that is managed by an operating system. The method further includes transmitting the memory access to a memory controller associated with the central processing unit for processing. The processing can include at least one of a memory write operation or a memory read operation.

Other embodiments include, without limitation, a system that implements one or more aspects of the disclosed techniques, and one or more computer readable media including instructions for performing one or more aspects of the disclosed techniques, as well as a method for performing one or more aspects of the disclosed techniques.

At least one technical advantage of the disclosed techniques relative to the prior art is that, with the disclosed techniques, a parallel processor executing threads has access to a large amount of memory without incurring the bandwidth penalty of paging in from and paging out to system memory. In an alternative approach, the parallel processor, such as a GPU, directly reads from and writes to system memory. This alternative approach typically requires an input/output memory management unit (IOMMU) address translation, which can lead to reduced performance. By contrast, an advantage of the disclosed technique is that memory accesses can be directed towards the memory at full link bandwidth without the overhead of IOMMU translation. As a result, threads that are highly parallelizable and access a large memory space execute with increased performance on a parallel processor relative to prior approaches. These advantages represent one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

System Overview

Figure 1:
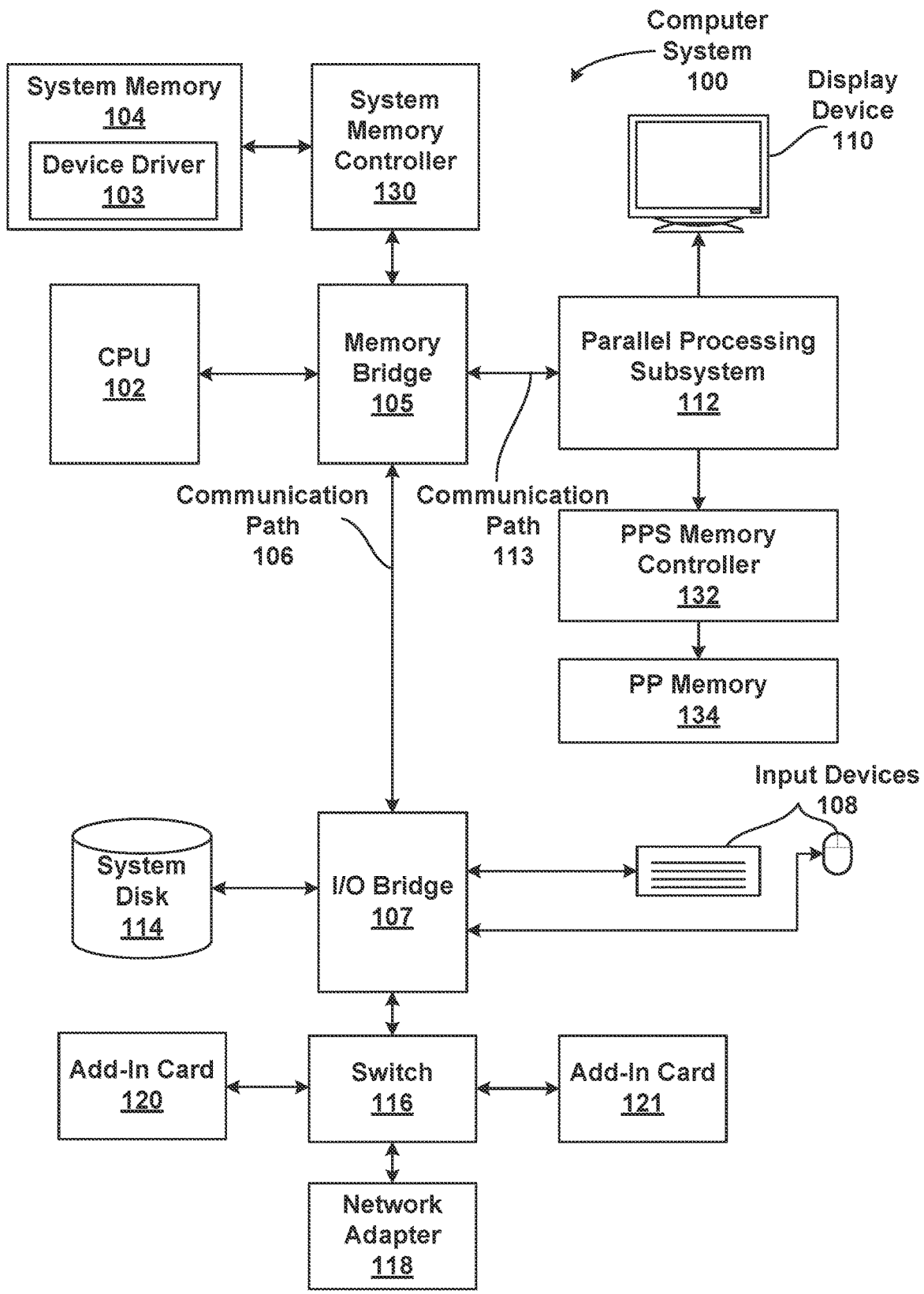
FIG. 1 is a block diagram of a computer system configured to implement one or more aspects of the various embodiments.

FIG. 1 is a block diagram of a computer system 100 configured to implement one or more aspects of the various embodiments. As shown, computer system 100 includes, without limitation, a central processing unit (CPU) 102 and a system memory 104 coupled to a parallel processing subsystem 112 via a memory bridge 105 and a communication path 113. Memory bridge 105 is coupled to system memory 104 via a system memory controller 130. Memory bridge 105 is further coupled to an I/O (input/output) bridge 107 via a communication path 106, and I/O bridge 107 is, in turn, coupled to a switch 116. Parallel processing subsystem 112 is coupled to parallel processing memory 134 via a parallel processing subsystem (PPS) memory controller 132.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, and/or the like. In such embodiments, parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In some embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

CPU 102 and PPUs within parallel processing subsystem 112 access system memory via a system memory controller 130. System memory controller 130 transmits signals to the memory devices included in system memory 104 to initiate the memory devices, transmit commands to the memory devices, write data to the memory devices, read data from the memory devices, and/or the like. In addition, PPUs and/or other components within parallel processing subsystem 112 access PP memory 134 via a parallel processing system (PPS) memory controller 132. PPS memory controller 132 transmits signals to the memory devices included in PP memory 134 to initiate the memory devices, transmit commands to the memory devices, write data to the memory devices, read data from the memory devices, and/or the like. In some embodiments, each PPU has an attached PP memory 134 which is accessible via PPS memory controller 132. In other embodiments, computer system 100 does not include separate PP memory 134. In such embodiments, the PPUs within parallel processing subsystem 112 access system memory 104 as the primary computing memory of the PPUs.

In various embodiments, parallel processing subsystem 112 may be integrated with one or more other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
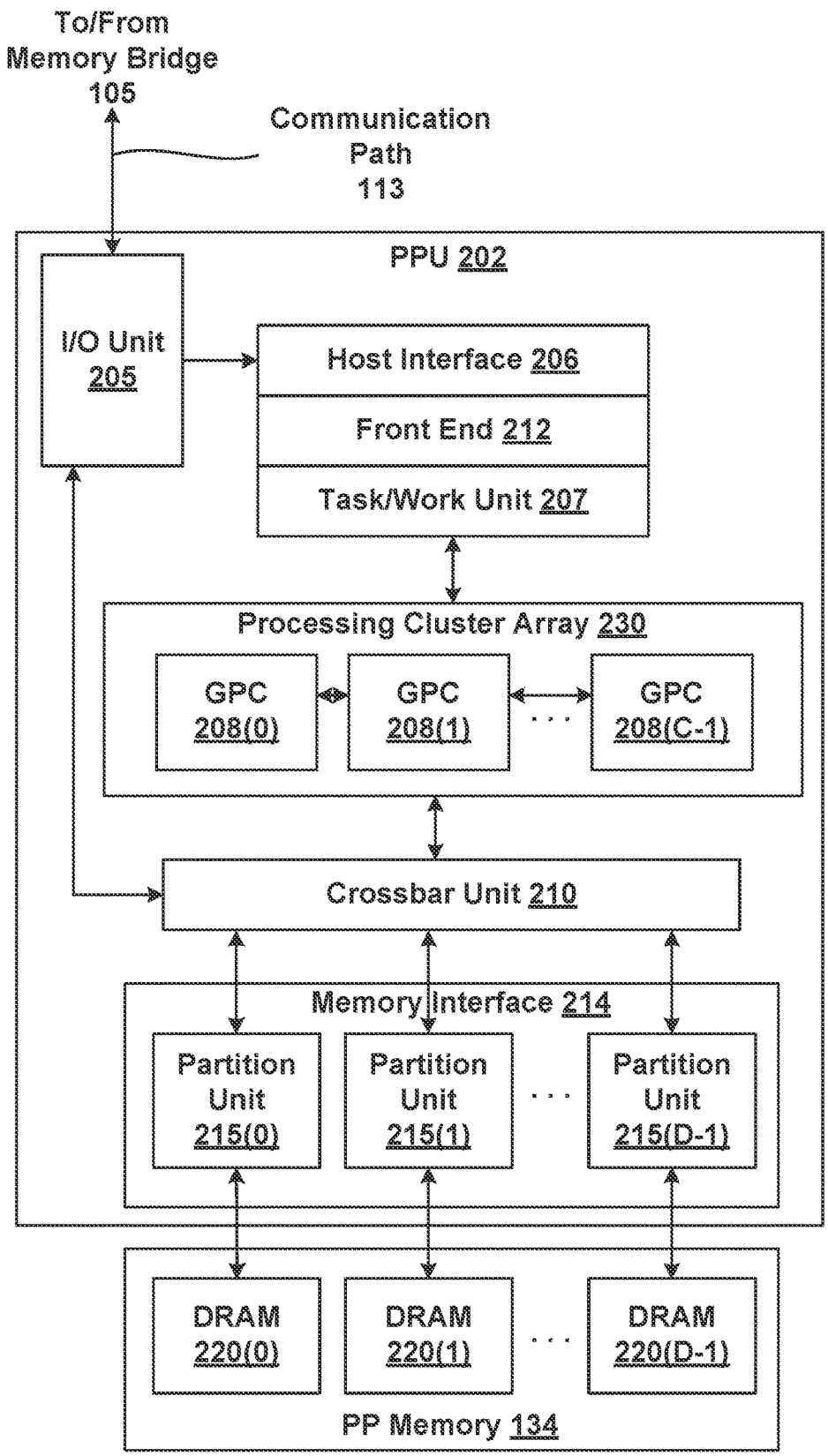
FIG. 2 is a block diagram of a parallel processing unit (PPU) included in the parallel processing subsystem of FIG. 1, according to various embodiments.

FIG. 2 is a block diagram of a parallel processing unit (PPU) 202 included in the parallel processing subsystem 112 of FIG. 1, according to various embodiments. Although FIG. 2 depicts one PPU 202, as indicated above, parallel processing subsystem 112 may include any number of PPUs 202. As shown, PPU 202 can be coupled to a local parallel processing (PP) memory 134. PPU 202 and PP memory 134 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 134 can be used as graphics memory that stores one or more conventional frame buffers and, if needed, one or more other render targets as well. Among other things, PP memory 134 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 134, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 134) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of an independent sequence of instructions. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D≥1. Each partition unit 215 is coupled to one or more dynamic random access memories (DRAMs) 220 residing within PP memory 134. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 134.

A given GPC 208 may process data to be written to any of the DRAMs 220 within PP memory 134. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 134 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity, and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 134 to one or more on-chip memory units, process the data, and write result data back to system memory 104 and/or PP memory 134. The result data may then be accessed by other system components, including CPU 102, another PPU 202 within parallel processing subsystem 112, or another parallel processing subsystem 112 within computer system 100. Data transfers between two or more PPUs 202 over high-speed links are referred to herein as peer transfers and such PPUs 202 are referred to herein as peers.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 134. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3:
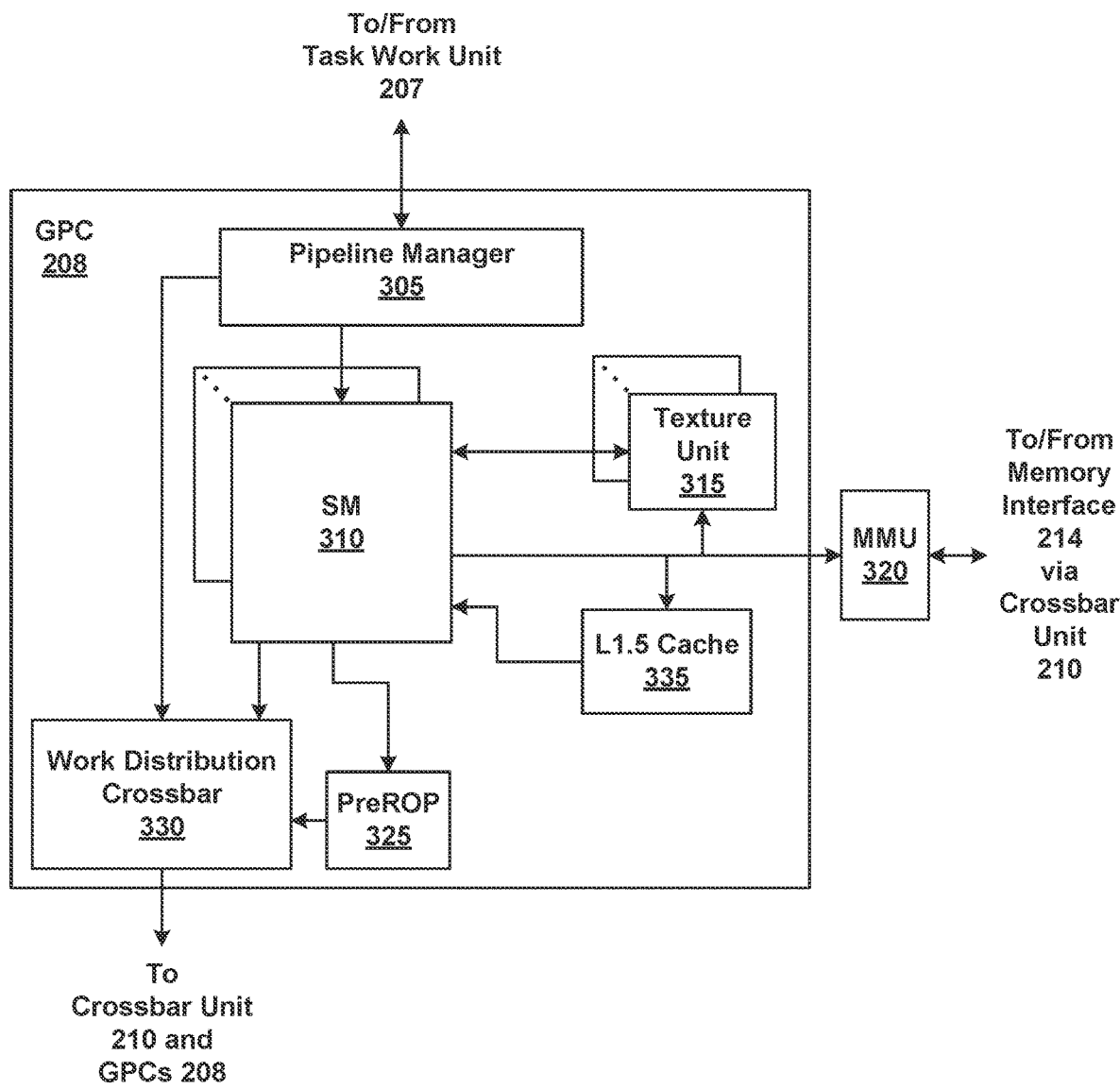
FIG. 3 is a block diagram of a general processing cluster (GPC) included in the parallel processing unit (PPU) of FIG. 2, according to various embodiments.

FIG. 3 is a block diagram of a general processing cluster (GPC) 208 included in the parallel processing unit (PPU) 202 of FIG. 2, according to various embodiments. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of M of SMs 310, where $M \geq 1$. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (e.g., AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310. In various embodiments, a software application written in the compute unified device architecture (CUDA) programming language describes the behavior and operation of threads executing on GPC 208, including any of the above-described behaviors and operations. A given processing task may be specified in a CUDA program such that the SM 310 may be configured to perform and/or manage general-purpose compute operations.

Although not shown in FIG. 3, each SM 310 contains a level one (L1) cache or uses space in a corresponding L1 cache outside of the SM 310 to support, among other things, load and store operations performed by the execution units.

Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 134 and/or system memory 104. It is to be understood that any memory external to PPU 202 may be used as global memory. Additionally, as shown in FIG. 3, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 134, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3 in no way limits the scope of the various embodiments of the present disclosure.

Please note, as used herein, references to shared memory may include any one or more technically feasible memories, including, without limitation, a local memory shared by one or more SMs 310, or a memory accessible via the memory interface 214, such as a cache memory, parallel processing memory 134, or system memory 104. Please also note, as used herein, references to cache memory may include any one or more technically feasible memories, including, without limitation, an L1 cache, an L1.5 cache, and the L2 caches.

Accessing High Bandwidth Extended Memory in a Parallel Processing System

Various embodiments include techniques for accessing extended memory in a parallel processing system. With the disclosed techniques, a platform or "socket" combines a CPU 102 with one or more associated PPUs 202, where the CPU 102 and the PPU 202 are connected by a high speed chip-to-chip (C2C) interface. In some embodiments, the high speed C2C interface is accessible at a peak bandwidth of 450 GB/s. The CPU 102 and the one or more associated PPUs 202 may be implemented as separate dies, embodied within the same SoC, and/or the like. In some embodiments, a system, also referred to as a "node," may execute a single operating system and may include multiple sockets. The CPU 102 includes 256 GB to 512 GB of system memory 104, accessible at a peak bandwidth of 546 GB/s. A portion of system memory 104 included in the CPU 102 is accessible from the PPU 202 as an additional peer, where the peer is system memory that is accessed as PPU memory at high bandwidth. This portion of system memory 104 is referred to herein as extended GPU memory (EGM) or, more simply, extended memory. EGM exhibits at least three features. First, when the PPU 202 accesses EGM, the memory accesses are conveyed to the CPU 102 as peer requests at a peak bandwidth of 450 GB/s. Second, the peer requests from the PPU 202 are routed to a CPU 102 on a local socket and/or a remote socket using high speed links at a peak bandwidth of 450 GB/s. Third, the EGM is limited to a carved-out portion of CPU 102 memory that is disjoint from the memory used by the operating system executing on the CPU 102. EGM conforms to the existing memory model and/or programming model, of the PP memory 134 accessible by the PPU 202. As a result, threads do not have to be rewritten in order to take advantage of EGM and the corresponding performance improvements. Further, EGM is extensible to systems with multiple sockets, such that a PPU 202 on one socket may access EGM on the same socket and/or EGM on one or more remote sockets. In such a system, sockets may be directly connected via a high-speed link. Additionally or alternatively, sockets may be connected via separate high-speed links to a high-speed switch for communications among PPUs 202 on multiple sockets. In some embodiments, EGM provides a high-speed access to system memory 104 for a PPU 202 that lacks a local PP memory 134.

In some embodiments, most of the system memory 104 included in the CPU 102 is available as EGM, while the CPU 102 retains a small amount of memory to boot and configure the system and to manage system memory 104 errors. In some embodiments, the majority of the system memory 104 included in the CPU 102 is available as EGM, while the CPU 102 retains sufficient system memory 104 to execute an operating system and one or more application programs. Further, in some embodiments, the EGM may employ fabric linear addresses (FLA). The FLA is an additional linear address space for peer addressing between two or more PPUs 202. In some embodiments, for EGM memory operations, the system level memory management unit may not perform a memory address translation, thereby further reducing the time to process a memory access and increasing memory performance. Further, EGM accesses are processed by the MMU 320 on the PPU 202, where the page size utilized by the MMU 320 on the PPU 202 is typically larger than the page size utilized by the system level memory management unit. In some examples, the MMU 320 on the PPU 202 employs a page size of 2 MB, whereas the system level memory management unit employs a page size of 4

KB. In some examples, MMU 320 on the PPU 202 can employ a page size of up to 512 MB for FLA memory operations. By using a large page size, TLB misses and associated performance penalties are reduced, relative to prior approaches.

Figure 4:
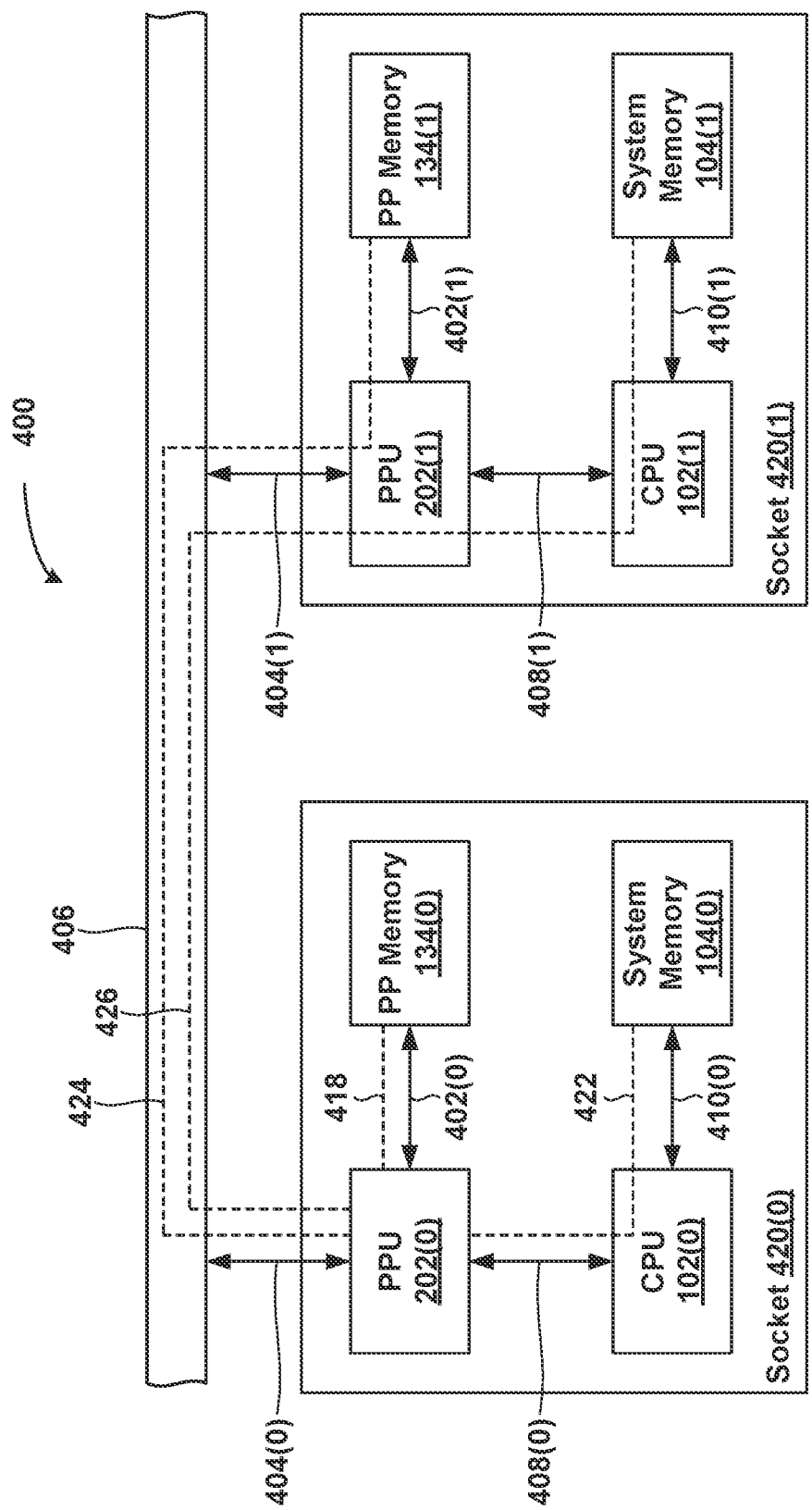
FIG. 4 is a block diagram of an EGM system that includes multiple sockets, according to various embodiments.

FIG. 4 is a block diagram of an extended memory system 400 that includes multiple sockets, according to various embodiments. The extended memory system 400, also referred to herein as an "EGM system," includes, without limitation, two sockets 420(0) and 420(1) connected via a high-speed switch 406. Each of the sockets 420(0) and 420(1) may be implemented via the computer system 100 of FIG. 1. The first socket 420(0) includes, without limitation, a CPU 102(0), a PPU 202(0), system memory 104(0), and PP memory 134(0). Likewise, the second socket 420(1) includes, without limitation, a CPU 102(1), a PPU 202(1), system memory 104(1), and PP memory 134(1). The description of the first socket 420(0) applies equally to the second socket 420(1), and vice versa.

The CPU 102(0) communicates with the system memory 104(0) over a high-bandwidth memory interface 410(0). In some embodiments, the memory interface 410(0) has a bandwidth in the range of 546 GB/s. Similarly, the PPU 202(0) communicates with PP memory 134(0) over a high-bandwidth memory interface 402(0). In some embodiments, the memory interface 402(0) has a bandwidth in the range of 4,500 GB/s, approximately 10 times the bandwidth of the memory interface 410(0) between the CPU 102 and the system memory 104(0). The PPU 202(0) communicates with the CPU 102(0) over a chip-to-chip interface 408(0). In some embodiments, the chip-to-chip interface 408(0) has a bandwidth of 450 GB/s.

When the PPU 202(0) executes threads that access data stored in local PP memory 134(0), the PPU 202(0) accesses data via high-speed channel 418, which utilizes the memory interface 402(0), at a bandwidth of 4,500 GB/s. If the threads executing on PPU 202(0) access more data than can be stored in PP memory 134(0), then the PPU 202(0) may further access data stored in the PP memory 134(1) on a remote socket 420(1). The PPU 202(0) may allocate a portion of PP memory 134(1) associated with the PPU 202(1) on the remote socket 420(1). The PPU 202(0) accesses this portion of PP memory 134(1) via high-speed channel 424. High-speed channel 424 utilizes a high-speed link 404(0) that links the socket 420(0) to a high-speed switch 406. The high-speed switch 406, in turn, links to the remote socket 420(1) via a high-speed link 404(1). In some embodiments, the high-speed links 404(0) and 404(1) and the high-speed switch 406 operate at a bandwidth of up to 450 GB/s. High-speed channel 424 then routes through PPU 202(1) to the PP memory 134(1). In the described example, the memory interface 402 has a bandwidth of 4,500 GB/s. As a result, the PPU 202(0) accesses the allocated portion of the PP memory 134(1) at the lower bandwidth of the high-speed links 404(0) and 404(1) and the high-speed switch 406, up to 450 GB/s. By utilizing a portion of the PP memory 134(1) of the remote PPU 202(1), the local PPU 202(0) is able to increase the amount of high-speed memory available to threads executing on the local PPU 202(0). However, the amount of PP memory 134(1) available to the remote PPU 202(1) is decreased, which may negatively impact threads executing on the remote PPU 202(1).

Additionally or alternatively, if the threads executing on PPU 202(0) access more data than can be stored in PP memory 134(0), then the PPU 202(0) may access data stored in system memory 104(0). With traditional approaches, the PPU 202(0) may load data from and store data to system memory 104(0) via the system memory management unit of the CPU 102(0) at a bandwidth of approximately 50 to 64 GB/s.

By contrast, with EGM, if the threads executing on PPU 202(0) access more data than can be stored in PP memory 134(0), then the PPU 202(0) may further access data stored in system memory 104(0) on the local socket 420(0) and/or system memory 104(1) on a remote socket 420(1). To access EGM on the local socket 420(0), a portion of the system memory 104(0) is allocated as EGM, for direct access by the PPU 202(0). With EGM, the PPU 202(0) bypasses the system memory management unit of the CPU 102(0) and accesses the EGM portion of system memory 104(0) via high-speed channel 422. High-speed channel 422 utilizes the chip-to-chip interface 408(0) and the high-bandwidth memory interface 410(0). In the described example, the chip-to-chip interface 408(0) has a bandwidth of 450 GB/s, and the high-bandwidth memory interface 410(0) has a bandwidth of 546 GB/s. As a result, the PPU 202(0) accesses the EGM portion of system memory 104(0) at the lower of these two bandwidths, or 450 GB/s.

To access EGM on the remote socket 420(1), the local PPU 202(0) may allocate a portion of the system memory 104(1) associated with the CPU 102(1) on the remote socket 420(1). The PPU 202(0) accesses this portion of system memory 104(1) via high-speed channel 426. High-speed channel 426 utilizes the high-speed link 404(0) that links the socket 420(0) to the high-speed switch 406. The high-speed switch 406, in turn, links to the remote socket 420(1) via the high-speed link 404(1). The PPU 202(0) bypasses the system memory management unit of the CPU 102(1) and accesses the EGM portion of system memory 104(1). High-speed channel 426 utilizes the chip-to-chip interface 408(1) and the high-bandwidth memory interface 410(1). In the described example, the high-speed links 404(0) and 404(1) and the high-speed switch 406 have a bandwidth of up to 450 GB/s, the chip-to-chip interface 408(1) has a bandwidth of 450 GB/s, and the high-bandwidth memory interface 410(1) has a bandwidth of 546 GB/s. As a result, the PPU 202(0) accesses the EGM portion of system memory 104(0) at the lowest of these bandwidths, up to 450 GB/s. As a result, high-speed channel 426 provides high-speed EGM memory space to the local PPU 202(0) without reducing the PP memory 134(1) available to the remote PPU 202(1). Therefore, the performance of the remote PPU 202(1) is not reduced by the allocation of a portion of system memory 104(1) as EGM for the local PPU 202(0).

From a programming model perspective, EGM is exposed in various ways, related to the mechanism for allocating memory when the CPU 102(0) allocates memory and makes the memory accessible to the PPU 202(0). In general, the memory model is the same whether the PPU 202(0) accesses local PP memory 134(0), remote PP memory 134(1), EGM memory in local system memory 104(0), or EGM memory in remote system memory 104(1).

In some examples, when a CUDA application allocates memory to the PPU 202(0), the CUDA application may allocate local PP memory 134(0), remote PP memory 134(1), EGM memory in local system memory 104(0), and/or EGM memory in remote system memory 104(1). When the CPU 102(0) allocates pinned EGM in local system memory 104(0), the CPU 102(0) establishes the mappings in the PPU page tables that allow the PPU 202(0) to send accesses over the chip-to-chip interface 408(0) to the EGM in system memory 104(0). With pinned memory the memory allocation remains in the same physical location for the duration of the allocation. The CPU 102(0) further establishes the mappings in the page tables that allow remote PPUs, such as 202(1), to send accesses over the chip-to-chip interface 408(0) to the EGM in system memory 104(0), including remote PPUs in the same process, PPUs in different processes on the same socket 420(0), or PPUs in different processes on remote sockets, such as socket 420(1). In general, EGM is pinned so that PPUs can refer to EGM via the PPU page tables without regard as to whether the EGM is migrated or paged out by the CPU 102(0).

In some examples, EGM is allocated via a managed memory mechanism in CUDA. With managed memory, the memory allocation is allowed to move between various memories in the overall computer system 100. To support this functionality, system software is able to detect accesses, revoke permissions as appropriate, migrate physical pages, revise page tables accordingly, and reenable access to the allocated memory. With managed memory, system software is allowed to move data among various physical memory locations. During allocation, when the capacity of the PP memory 134(0) is exceeded, system software may allocate EGM memory from system memory 104(0). The EGM memory allocated from the system memory 104(0) is then able to directly service memory requests from the PPU 202(0). As memory accesses occur over time, the system software utilizes heuristics to migrates physical pages between PP memory 134(0), the EGM portion of system memory 104(0), and the non-EGM portion of system memory 104(0).

In some examples, a system memory allocator executing on the CPU 102(0) is able to allocate physical memory from system memory 104(0) and make that memory accessible as EGM memory to the PPU 202(0). With system memory allocation, allocated memory may be accessible via the local PPU 202(0) on the local socket 420(0). Additionally or alternatively, EGM memory is a separate memory associated with the CPU 102(0) that is also accessible via the local PPU 202(0) on the local socket 420(0).

Once an EGM memory allocation is established via one or more of these allocation methods, and the mappings have been generated, the corresponding PPU 202 is able to access the allocated EGM memory using the same programming model as for PPU 202 accesses of local PP memory 134. When the processes of the threads complete, the threads release the allocations in the same manner as releasing allocations for local PP memory 134. When the reference count for an EGM memory page decreases to 0, the EGM memory page is released in the same manner as releasing memory pages for local PP memory 134. The release allocation and corresponding memory pages are then ready for subsequent allocation.

In some embodiments, the amount of system memory 104(0) reserved for EGM memory may be set at system initialization and remains constant. In some embodiments, the amount of system memory 104(0) reserved for EGM memory may be dynamic and may change over time. In these latter embodiments, the operating system executing on the CPU 102(0) cooperates with the MMU 320 on the PPU 202(0) to manage the dynamically changing size of the EGM portion of system memory 104(0).

Figure 5A:
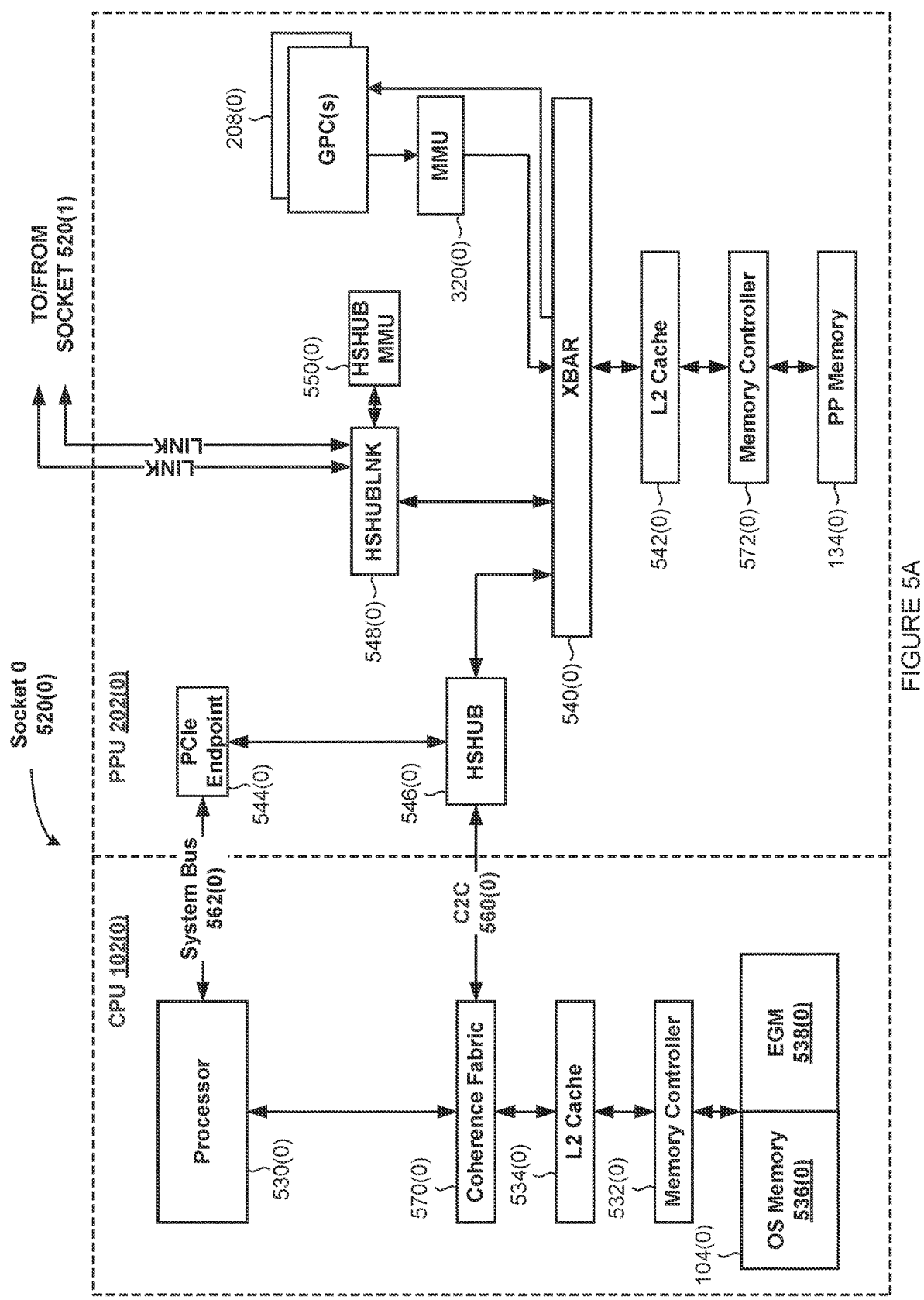
FIGS. 5A-5B are a more detailed block diagram of an EGM system that includes multiple sockets, according to various embodiments.
Figure 5B:
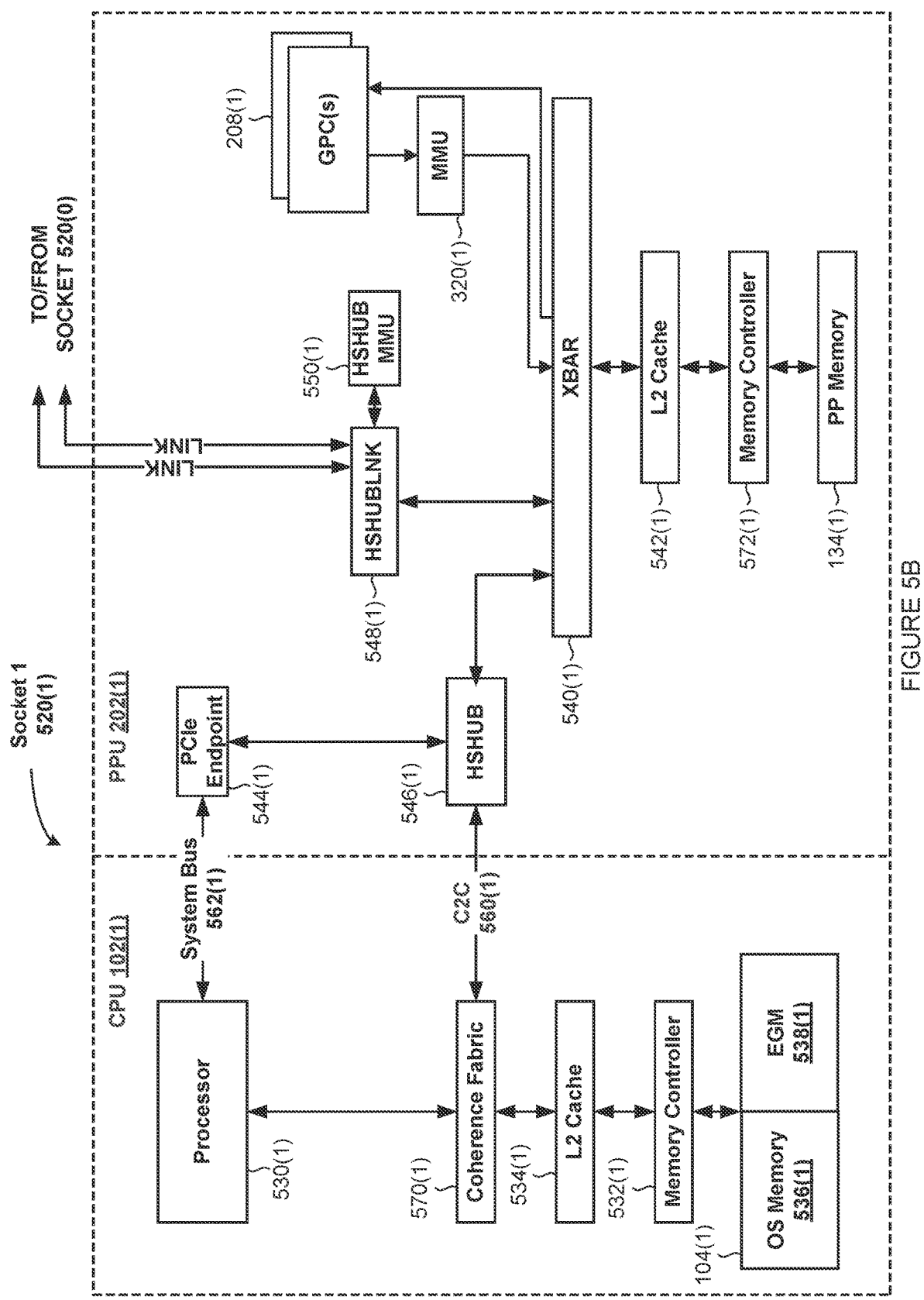

FIGS. 5A-5B are a more detailed block diagram of an extended memory system that includes multiple sockets, according to various embodiments. As shown, the extended memory system, also referred to herein as an "EGM system," includes, without limitation, two sockets 520(0) and 520(1). Each of the sockets 520(0) and 520(1) may be implemented via the computer system 100 of FIG. 1. Additionally or alternatively, each of the sockets 520(0) and 520(1) may be implemented via the sockets 420(0) and 420(1) of FIG. 4. The first socket 420(0) includes, without limitation, a CPU 102(0) and a PPU 202(0). Likewise, the second socket 420(1) includes, without limitation, a CPU 102(1) and a PPU 202(1). The description of the first socket 420(0) applies equally to the second socket 420(1), and vice versa.

The CPU 102(0) includes, without limitation, a processor 530(0), a coherence fabric 570(0), a memory controller 532(0), a level 2 (L2) cache 534(0), and system memory 104(0). The processor 530(0) communicates with the PPU 202(0) via a system bus 562(0) coupled to a PCIe endpoint 544(0) included in the PPU 202(0). The processor 530(0) accesses system memory 104(0) via the coherence fabric 570(0) and the memory controller 532(0). The coherence fabric 570(0) accesses system memory 104(0) on behalf of the processor 530(0). The memory controller 532(0) stores data and loads data from system memory 104(0) and stores recently accessed data from the system memory 104(0) in the L2 cache 534(0). Further, the coherence fabric 570(0) accesses system memory 104(0) on behalf of the PPU 202(0) via a chip-to-chip (C2C) interface 560(0) and stores recently accessed data from the system memory 104(0) in the L2 cache 534(0). Further, the L2 cache 534(0) stores recently accessed data from the system memory 104(0) resulting from memory access requests issued by the CPU 102(0) and/or the PPU 202(0). In some embodiments, the chip-to-chip interface has a bandwidth of 450 GB/s. The system memory 104(0) is divided into two portions, an operating system (OS) memory 536(0) and EGM 538(0). The OS memory 536(0) stores instructions and data accessible by the processor 530(0). Additionally or alternatively, the OS memory 536(0) is accessible by the PPU 202(0), typically at a lower bandwidth. The instructions and data stored in the OS memory 536(0) include instructions for booting and configuring the system, instructions for managing system memory errors, an operating system, application programs, and/or the like. The EGM 538(0) is accessible to the PPU 202(0) via the chip-to-chip interface and serves as an extended memory for the PP memory 134(0). The amount of memory allocated from system memory 104(0) to EGM memory 538(0) may be fixed or dynamic and may be any technically feasible portion of the system memory 104(0). In one example, the OS memory 536(0) may have a size of 64 GB and the EGM memory 538(0) may have a size of 448 GB.

The PPU 202(0) includes, without limitation, GPCs 208(0), an MMU 320(0), PP memory 134(0), an L2 cache 542(0), a crossbar 540(0), a high-speed hub (HSHUB) 546(0), a high-speed hub link (HSHUBLNK) 548(0), a high-speed hub MMU (HSHUBMMU) 550(0), and a memory controller 572(0).

In operation, the PPU 202(0) accesses local PP memory 134(0), remote PP memory 134(1), EGM memory 538(0) that resides on the local socket 520(0), and EGM memory 538(1) that resides on a remote socket 520(1). Additionally or alternatively, the PPU 202(0) accesses system memory 104(0), typically at relatively lower speeds, for the purpose of loading pushbuffers and/or other system operations.

In a first use case, a GPC 208(0) accesses a memory address that resides in PP memory 134(0). The MMU 320(0) accesses a PPU page table entry that identifies the memory access as being directed towards a local memory aperture. The MMU 320(0) performs a virtual address to physical address translation and routes the memory transaction to the crossbar 540(0). The crossbar 540(0) transmits the memory access to the L2 cache 542(0). If the data corresponding to the memory access resides in the L2 cache 542(0), then the L2 cache 542(0) fulfills the memory access. If the data corresponding to the memory access does not reside in the L2 cache 542(0), then the memory controller 572(0) accesses the data from the PP memory 134(0), loads the data into the L2 cache 542(0), and fulfills the memory access.

In a second use case, a GPC 208(0) accesses EGM memory 538(0) that resides on the local socket 520(0). The MMU 320(0) accesses a PPU page table entry that identifies the memory access as being directed towards a peer memory aperture. The PPU page table entry includes a field that includes a peer identifier (ID) that corresponds with the peer ID of the EGM memory 538(0) on the local socket 520(0). The MMU 320(0) accesses routing registers, referred to as peer routing registers. These registers include one register for each of the possible peer IDs, such as 8 peer IDs, where each register contains routing information that determines the destination for the corresponding peer IDs. The peer routing registers determine which destination any given peer ID corresponds to. Such destinations include EGM 538(0) located on the local socket 520(0), PP memory 134(1) located on the remote socket 520(1), EGM 538(1) located on the remote socket 520(1), and/or the like. In this use case, the peer routing registers indicate EGM 538(0) located on the local socket 520(0). As a result, the request is routed to the high-speed hub (HSHUB) 546(0). The high-speed hub 546(0) interfaces via the C2C interface 560(0) to the local CPU 102(0). The peer routing register corresponding to the peer ID from the PPU page table identifies the high-speed hub 546(0) as the target of the memory access. The MMU 320(0) transmits the memory access to the high-speed hub 546(0) via the crossbar 540(0).

The high-speed hub 546(0) identifies the memory access as being one of four possible types, based on a field included in the memory access and set by the MMU 320(0) during virtual address to physical address translation. Two of the memory access types are targeted for system memory 104(0) and two of the memory access types are targeted for peer memory. The two memory access types targeted for system memory 104(0) (SYSMEM_GPA and SYSMEM_SPA) are not related to accesses of EGM memory 538(0) and are not described further. Likewise, the peer memory access type directed towards system memory (PEER_SPA) is not related to accesses of EGM memory 538(0) and is not described further. The peer memory access type targeted for peer memory (PEER_GPA) is related to accesses of EGM memory 538(0). These four memory access types are shown in Table 1 below.

| Memory Access Type | Description |
| --- | --- |
| SYSMEM_GPA | Memory access request directed to system memory 104(0) on local CPU 102(0) to be translated by system MMU. Not an EGM request. |
| SYSMEM_SPA | Fully translated directed to system memory 104(0) on local CPU 102(0). Not an EGM request. |
| PEER_GPA | Peer request that is zero-based relative to the starting address of the EGM memory 538(0) segment on the socket 520(0). Alternatively, if a certain bit is set, the peer request passes through the HSHUB MMU 550(0) for one additional stage of address translation. |
| PEER_SPA | Same as SYSMEM_SPA memory access type. Not an EGM request. |

In some embodiments, the memory access request may further include a guest identifier (ID) that identifies the virtual machine that submitted the memory access. Each guest ID is associated with a range of addresses in EGM memory 538(0) that the corresponding guest is permitted to access. The guest ID indicates and identifies the guest virtual machine. In some embodiments, the guest ID may be an identifier between 0 and 64. The guest ID indexes into a set of EGM_BASE[ ] and EGM_SIZE[ ] registers. In operation, EGM_BASE[guest_ID] is added to the memory access request address. If the memory address is within the range specified by EGM_SIZE[guest_ID], then the high-speed hub 546(0) transmits the memory access over the C2C interface 560(0) to the coherence fabric 570(0) for processing. If, however, the memory access specifies an address that is outside the range permitted for the corresponding guest ID, that is, an address that is greater than or equal to EGM_SIZE [guest ID], then the high-speed hub 546(0) blocks the memory access and does not forward the memory access to the C2C interface 560(0).

Upon receiving a memory access from the high-speed hub 546(0) and the C2C interface 560(0), the coherence fabric 570(0) accesses the L2 cache 534(0) and/or the EGM 538(0) to fulfill the memory access. The coherence fabric 570(0) returns the result of the memory access to the requesting GPC 208(0) via the high-speed hub 546(0) and the crossbar 540(0).

In a third use case, a GPC 208(0) accesses EGM memory 538(0) that resides on a remote socket 520(1). The MMU 320(0) accesses a PPU page table entry that identifies the memory access as being directed towards a peer memory aperture. The PPU page table entry includes a field that includes a peer identifier (ID) that corresponds with the peer ID of the EGM memory 538(1) on the remote socket 520(1). The MMU 320(0) accesses the routing register corresponding to the peer ID, which identifies the high-speed hub link 548(0) as the target of the memory access. The MMU 320(0) transmits the memory access to the high-speed hub link 548(0) via the crossbar 540(0). The high-speed hub link 548(0) transmits the memory access to the high-speed hub link 548(1) on the remote socket 520(1) via a high-speed link and/or high-speed switch. The high-speed hub link 548(1) on the remote socket 520(1) transmits the memory access to the high-speed hub 546(1) via the crossbar 540(1). The high-speed hub 546(1) transmits the memory access to C2C interface 560(0) and then to the coherence fabric 570(1) which, in turn, accesses the L2 cache 534(1) and/or the EGM memory 538(1) to fulfill the memory access.

In a fourth use case, a GPC 208(0) accesses EGM memory 538(0) that resides on a remote socket 520(1) via a fabric linear address (FLA) memory address space. The MMU 320(0) accesses a PPU page table entry that identifies the memory access as being directed towards a peer memory aperture. The PPU page table entry includes an attribute that indicates that the request is a FLA address. The PPU page table entry includes a field that includes a peer identifier (ID) that corresponds with the peer ID of the EGM memory 538(1) on the remote socket 520(1). The MMU 320(0) accesses the routing register corresponding to the peer ID, which identifies the high-speed hub link 548(0) as the target of the memory access. The MMU 320(0) transmits the memory access to the high-speed hub link 548(0) via the crossbar 540(0). The memory access contains an attribute indicating that the request is an FLA request. Because the FLA attribute is set, the high-speed hub MMU 550(0) translates the address included in the memory access from an FLA address into a GPU physical address (GPA) address with a peer ID of the EGM memory 538(1) on the remote socket 520(1). The determination of whether this translation occurs is based on the attribute field in the page table of the high-speed hub MMU 550(1). In this remote EGM case, the aperture field is PEER and the PEER_ID maps the request to the high-speed hub (HSHUB) 546(1), the C2C interface 560(1), and the EGM 538(1) on the remote PPU 202(1). The EGM 538(1) is local EGM from the point of view of the remote PPU 202(1) and remote EGM from the point of view of the local PPU 202(0) that initiated the request. FLA addressing facilitates communications between multiple sockets in a single node system and/or a multi-node system.

The high-speed hub link 548(0) transmits the memory access to the high-speed hub link 548(1) on the remote socket 520(1) via a high-speed link and/or high-speed switch. The high-speed hub MMU 550(1) on the remote socket 520(1) translates the FLA address back into a GPA address and determines whether the memory access is directed to the PP memory 134(1) or the EGM memory 538(1) on the remote socket 520(1). The high-speed hub link 548(1) on the remote socket 520(1) transmits the memory access to the high-speed hub 546(1) via the crossbar 540(1). The high-speed hub 546(1) transmits the memory access to the coherence fabric 570(1) which, in turn, accesses the L2 cache 534(1) and/or the EGM memory 538(1) to fulfill the memory access.

In addition, it will be apparent to one skilled in the art that there are many addressing mechanisms possible to address memory on a remote socket, using an additional level of indirection at the destination socket or intermediate stage. FLA addressing is described as an illustrative example. However, alternative addressing schemes for addressing EGM memory on a remote socket are also within the scope of the present disclosure.

In a fifth use case, a GPC 208(0) accesses a memory address that resides in PP memory 134(1) of the remote PPU 202(1). The MMU 320(0) accesses a PPU page table entry that includes a peer identifier (ID) that corresponds with the peer ID of the PP memory 134(1) on the remote socket 520(1). The MMU 320(0) accesses the routing registers. The peer routing register corresponding to the peer ID identifies the high-speed hub link 548(0) as the target of the memory access. The MMU 320(0) transmits the memory access to the high-speed hub link 548(0) via the crossbar 540(0). The high-speed hub link 548(0) transmits the memory access to the high-speed hub link 548(1) on the remote socket 520(1) via a high-speed link and/or high-speed switch. The high-speed hub link 548(1) on the remote socket 520(1) transmits the memory access to the crossbar 540(1). The crossbar 540(1) transmits the memory access to the L2 cache 542(1) and/or the PP memory 134(1) to fulfill the memory access.

It will be appreciated that the EGM systems shown in FIGS. 4-5B are illustrative and that variations and modifications are possible. As one example, the EGM systems of FIGS. 4-5B are shown with two sockets connected via high-speed links and/or switches. However, the EGM systems may include one socket, four or more sockets, and/or the like within the scope of the present disclosure. Further, each socket is shown as having one CPU 102 and one PPU 202. However, each socket may have any technically feasible number of CPUs 102 and/or PPUs 202.

In some examples, the interfaces described herein are specified to operate at certain bandwidth ranges or peak bandwidths, such as 50 to 64 GB/s, 450 GB/s, 546 GB/s, 4,500 GB/s. However, these interfaces can operate at any bandwidth ranges or peak bandwidths within the scope of this disclosure. In some examples, the system memory 104 and PP memory 134, and subsections thereof, are specified to be certain sizes with certain address ranges. However, the system memory 104 and PP memory 134, and subsections thereof, can be of any with any address ranges within the scope of this disclosure. In some examples, the EGM memory 538 is specified as memory that is not controlled by the operating system. In that regard, the EGM memory 538 is described as being distinct from the operating system memory 536. However, the EGM memory 538 can be any technically feasible memory, or portion thereof, including memory that is controlled by the operating system and/or portions of the operating system memory 536.

Figure 6A:
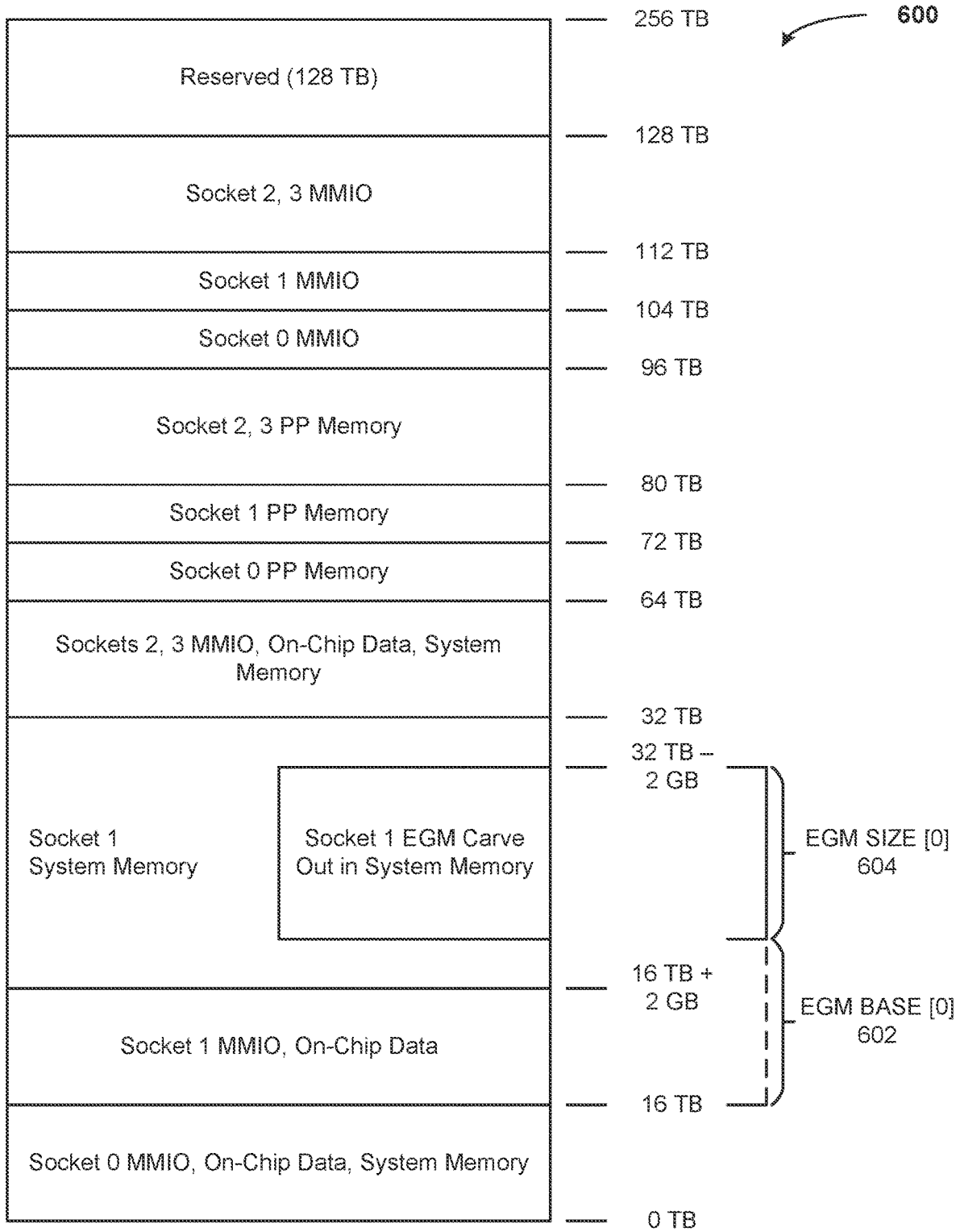
FIGS. 6A-6B illustrate memory maps of the EGM system of FIGS. 4-5B, according to various embodiments.
Figure 6B:
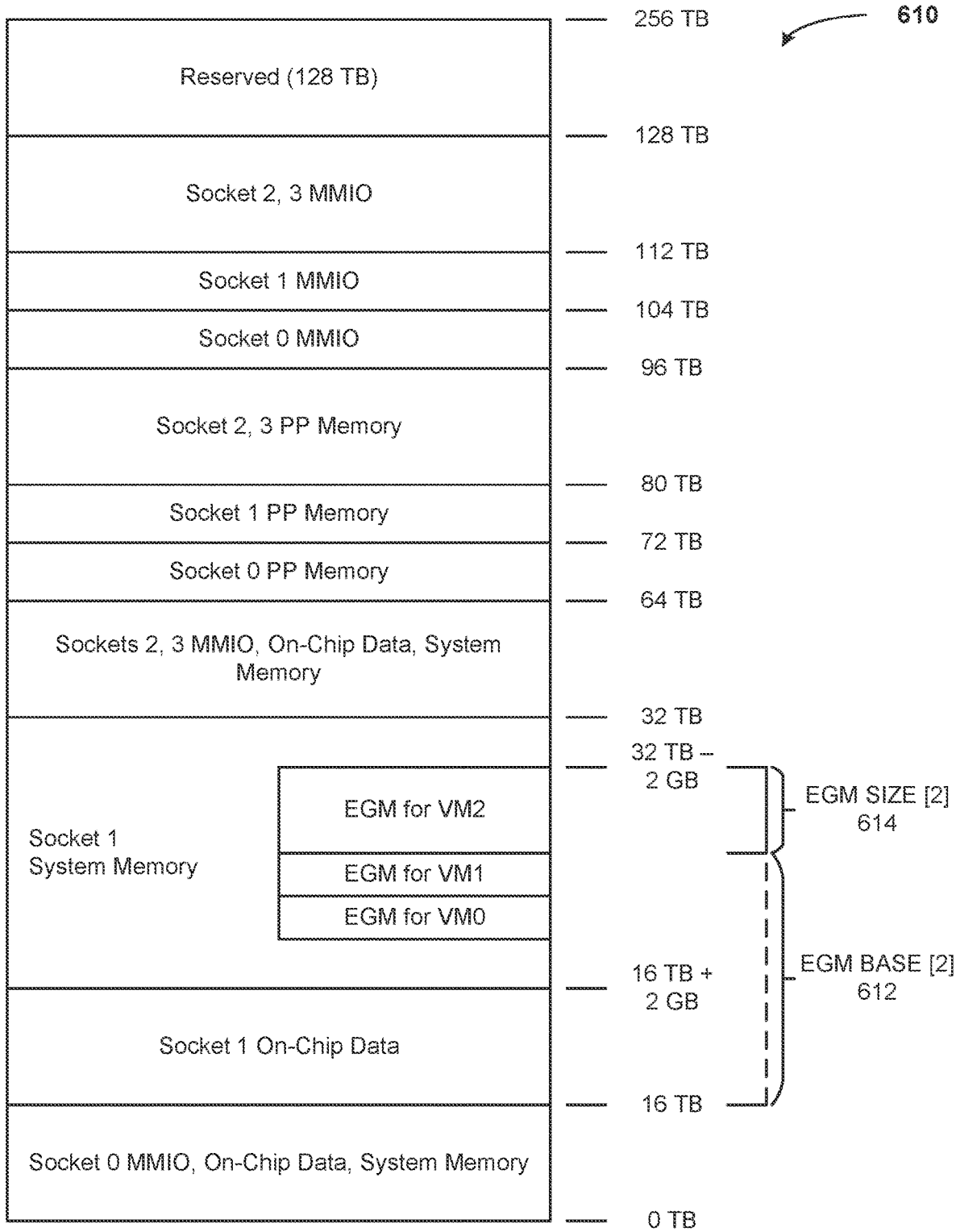

FIGS. 6A-6B illustrate memory maps 600 and 610 of the EGM system of FIGS. 4-5B, according to various embodiments.

As shown in FIG. 6A, the memory map 600 spans 256 TB and maps addresses for four sockets. The lower 128 TB of memory space is used for various purposes, while the upper 128 TB of memory space is reserved. Each socket has 16 TB of address space for CPU related memory, including memory mapped I/O (MMIO), on-chip data, and system memory 104, plus 16 TB of address space for PPU related memory, including PP memory 134 and MMIO. For socket 0, the CPU portion of memory ranges from address 0 TB to address 16 TB, the PP memory 134 ranges from address 64 TB to address 72 TB, and the PPU related MMIO portion of memory ranges from address 96 TB to address 104 TB. For socket 1, the CPU portion of memory ranges from address 16 TB to address 32 TB, the PP memory 134 ranges from address 72 TB to address 80 TB, and the PPU related MMIO portion of memory ranges from address 104 TB to address 112 TB. For the other two sockets, the CPU portion of memory ranges from address 32 TB to address 64 TB, divided evenly among the two sockets. The PP memory 134 ranges from address 80 TB to address 96 TB, again divided evenly among the two sockets. Similarly, PPU related MMIO portion of memory ranges from address 112 TB to address 128 TB, divided evenly among the two sockets. Further detail for the socket 1 memory map is described below. The memory maps for sockets 0, 2, and 3 are similar to the memory map for socket 1.

The 2 GB range from 16 TB to 16 TB+2 GB includes miscellaneous address spaces for socket 1, such as MMIO and on-chip data. The range from 16 TB+2 GB to 32 TB is system memory 104. As shown, system memory 104 is split between CPU memory and EGM memory. The EGM memory is a block of memory within system memory 104 with a base address of EGM base [0] 602 and a size of EGM size [0] 604. The remaining portion of the 16 TB-2 GB range (from 16 TB+2 GB to 32 TB) range for system memory 104 is for CPU memory.

As shown, EGM base [0] 602 is the starting address, also referred to herein as the base address, of the EGM carveout relative to the start of the CPU segment of memory for the current socket. EGM size [0] 604 is the range of memory addresses for the EGM carveout. In the system address map, the CPU segment for each socket is 16 TB. Accordingly, the CPU segment for socket 0 starts at OTB, the CPU segment for socket 1 starts at 16 TB, and so on. Each socket has an EGM carveout that lies within the CPU segment for that socket and is located at address CPU_SEGMENT_BASE [socket num]+EGM_BASE[0]. When virtualization is disabled, the system operates without virtual machines, and only EGM_BASE[0] and EGM_SIZE[0] are used to address the EGM carveout.

As shown in FIG. 6B, the memory map 610 also spans 256 TB and maps address for four sockets. The EGM memory can be divided up and shared among multiple virtual machines (VMs). In some embodiments, each of the VMs is assigned a designated, non-overlapping portion of the EGM. For example, a first portion of EGM memory may be reserved a first virtual machine (VM0), a second portion of EGM memory may be reserved a second virtual machine (VM1), and a third portion of EGM memory may be reserved a third virtual machine (VM2). For example, the portion of EGM memory for virtual machine VM2 is a block of memory with a base address of EGM base 612 and a size of EGM size 614. In this manner, EGM memory is available in systems that implement virtual machines.

A separate EGM_BASE[VM_ID] and EGM_SIZE [VM_ID] exists for each virtual machine. Each virtual machine is associated with an identifier of VM_ID. EGM_BASE[i] is the offset of the EGM carveout for virtual machine 'i' relative to the start of the CPU segment for each socket. As shown, virtual machine 2 has an EGM base [2] 612, which is the starting address, or the base address, of the EGM carveout for virtual machine 2 relative to the start of the CPU segment of memory for the current socket. EGM size [2] 614 is the range of memory addresses for the EGM carveout for virtual machine 2. Typically, the EGM carveouts for the various virtual machines are stacked and do not overlap with one another.

Figure 7:
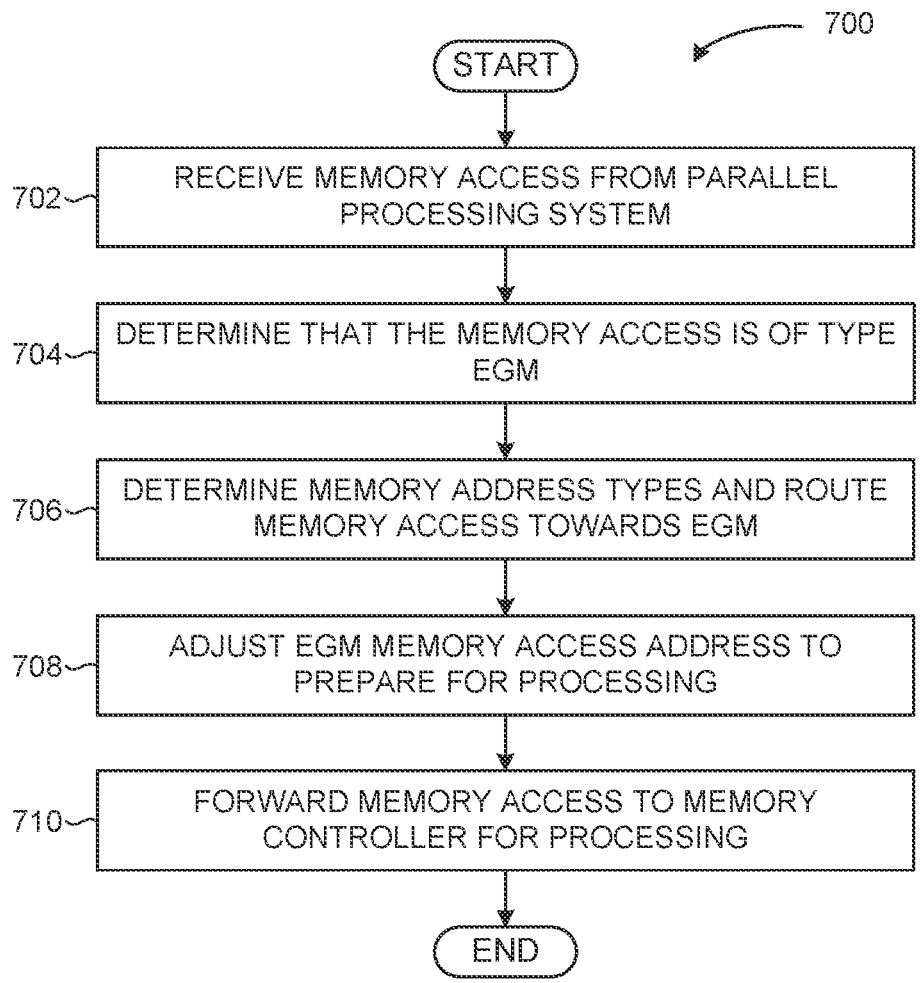
FIG. 7 is a flow diagram of method steps for accessing extended memory in a parallel processing system, such as the PPU of FIG. 2, according to various embodiments, according to various embodiments.

FIG. 7 is a flow diagram of method steps for accessing extended memory on a parallel system, such as the PPU 202 of FIG. 2, according to various embodiments. Although the method steps are described in conjunction with the systems of FIGS. 1-6B, persons of ordinary skill in the art will understand that any system configured to perform the method steps, in any order, is within the scope of the present disclosure.

As shown, a method 700 begins at step 702, where a memory management unit (MMU) 320 included in an extended memory system receives a memory access request from a parallel processing system. The memory request may be to read an instruction from memory, to read data from memory, to write data to memory, and/or the like.

At step 704, the MMU 320 determines that the memory access is of type EGM memory 538. Certain threads that execute on the parallel processing system may access more memory than the parallel processing system can directly address. Examples of such threads include recommender systems (that suggest relevant items for specific users), PageRank systems (that measure the importance of each node in a data graph based on relationships and connections among the nodes), data science and analytics systems, and other systems that utilize large in-memory databases. When a parallel processing system executes such threads, the parallel processing system may issue a memory access to a memory address outside of the range of the local memory of the parallel processing system. Such a memory access is an extended memory access. The MMU 320 may identify an extended memory access based on the memory address specified by the memory access, based on a field in the memory access that identifies an extended memory address, and/or the like.

At step 706, the MMU 320 determines memory address types of the memory access and routes the memory access towards EGM memory 538. The MMU 320 can identify the memory address types based on a field in a page table entry associated with the memory access, and/or the like. One memory address type targeted for peer memory is a system physical address (SPA) memory access type. With a SPA memory address type, the address specified by the memory access is a fully resolved physical address that needs no further address translation. The other memory address type targeted for peer memory is a GPU physical address (GPA) memory address type.

At step 708, the MMU 320 adjusts the EGM memory access address to prepare for processing. The MMU 320 can adjust the EGM memory access address based on the memory targeted by the memory access. In some examples, the MMU 320 adjusts the EGM memory access address by performing a translation from one address format specified by the memory access to another address format that is recognizable by the target of the memory access. One address format is a system physical address (SPA) that specifies a fully resolved physical address that needs no further address translation. Another address format is a GPU physical address (GPA) address that to which the base of the EGM aperture in the socket is added. Yet another address format is a fabric linear address (FLA) that is transmissible via one or more links and switches between two sockets. Additionally or alternatively, memory addresses may be specified via any technically feasible address format.

In a first use case, the parallel processing system accesses extended memory that resides on the local socket. The extended memory system includes an MMU 320 that accesses a page table entry that identifies the memory access as being directed towards a peer memory aperture. The page table entry includes a field that includes a peer identifier (ID) that corresponds with the peer ID of the EGM memory 538 on the local socket. The MMU 320 accesses routing registers, referred to as peer routing registers. These registers include one register for each of the possible peer IDs, such as 8 peers, where each register contains routing information that determines the destination for the corresponding peer IDs. The peer routing registers determine which destination any given peer ID corresponds to. The peer routing register corresponding to the peer for the local EGM memory 538 identifies the high-speed hub 546 as the target of the memory access. The MMU 320 transmits the memory access to the high-speed hub 546 via the crossbar 540.

In a second use case, the parallel processing system accesses EGM memory 538 that resides on a remote socket. The MMU 320 accesses a PPU page table entry that identifies the memory access as being directed towards a peer memory aperture. The PPU page table entry includes a field that includes a peer identifier (ID) that corresponds with the peer ID of the EGM memory 538 on the remote socket 520. The MMU 320 accesses the routing registers. The peer routing register corresponding to the peer ID identifies the high-speed hub link 548 as the target of the memory access. The MMU 320 transmits the memory access to the high-speed hub link 548 via the crossbar 540. The high-speed hub link 548 transmits the memory access to the high-speed hub link 548 on the remote socket 520 via a high-speed link and/or high-speed switch. The high-speed hub link 548 on the remote socket 520 transmits the memory access to the high-speed hub 546 via the crossbar 540. The high-speed hub 546 transmits the memory access to C2C interface 560 and then to the coherence fabric 570 which, in turn, accesses the L2 cache 534 and/or the EGM memory 538 to fulfill the memory access.

In a third use case, the parallel processing system accesses EGM memory 538 that resides on a remote socket via a fabric linear address (FLA) memory address space. The MMU 320(0) accesses a PPU page table entry that identifies the memory access as being directed towards a peer memory aperture. The PPU page table entry includes an attribute that indicates that the request is a FLA address. The PPU page table entry includes a field that includes a peer identifier (ID) that corresponds with the peer ID of the EGM memory 538(1) on the remote socket 520(1). The MMU 320(0) accesses the routing register corresponding to the peer ID, which identifies the high-speed hub link 548(0) as the target of the memory access. The MMU 320(0) transmits the memory access to the high-speed hub link 548(0) via the crossbar 540(0). The memory access contains an attribute indicating that the request is an FLA request. Because the FLA attribute is set, the high-speed hub MMU 550 translates the address included in the memory access from an FLA address into a GPA address with a peer ID of the EGM memory 538 on the remote socket 520. The determination of whether this translation occurs is based on the attribute field in the page table of the high-speed hub MMU 550(1). In this remote EGM case, the aperture field is PEER and the PEER_ID maps the request to the high-speed hub (HSHUB) 546(1), the C2C interface 560(1), and the EGM 538(1) on the remote PPU 202(1). The EGM 538(1) is local EGM from the point of view of the remote PPU 202(1) and remote EGM from the point of view of the local PPU 202(0) that initiated the request. FLA address facilitates communications between multiple sockets in a single node system and/or multi-node system. The high-speed hub link 548 transmits the memory access to the high-speed hub link 548 on the remote socket via a high-speed link and/or high-speed switch.

At step 710, the MMU 320 transmits the memory access to the memory controller 532 for processing. The MMU 320 transmits the memory access to a high-speed hub 546 which, in turn, transmits the memory access to a C2C interface 560 and then to a coherence fabric 570. The coherence fabric 570, in turn, transmits the memory access to the memory controller 532 that controls the EGM memory 538. In the first use case, the high-speed hub 546 transmits the memory access to a coherence fabric 570 on the local socket for processing. Upon receiving the memory access from the high-speed hub, the coherence fabric 570 accesses the L2 cache 534 and/or the EGM memory 538 to fulfill the memory access. The coherence fabric 570 returns the result of the memory access to the requesting parallel processing system via the high-speed hub 546 and the crossbar 540.

In the third use case described above, the high-speed hub link 548 transmits the memory access to the high-speed hub link 548 on the remote socket via a high-speed link and/or high-speed switch. The high-speed hub MMU 550 on the remote socket translates the FLA address into a GPA address and determines whether the memory access is directed to the PP memory 134 or the EGM memory 538 on the remote socket. The high-speed hub link 548 on the remote socket transmits the memory access to the high-speed hub 546 via the crossbar 540. The high-speed hub transmits the memory access to the C2C interface 560 and then to the coherence fabric 570 which, in turn, accesses the L2 cache 534 and/or the EGM memory 538 to fulfill the memory access.

The method 700 then terminates. Alternatively, the method 700 proceeds to step 702 to process additional memory accesses.

In sum, various embodiments include techniques for accessing extended memory in a parallel processing system. With the disclosed techniques, a platform or "socket" combines a central processing unit (CPU) with one or more parallel processing units (PPU), where the CPU and the PPU are connected by a high speed chip-to-chip (C2C) link. In some embodiments, the high speed C2C link is accessible at a peak bandwidth of 450 GB/s. The CPU and the one or more associated PPUs may be implemented as separate dies, embodied within the same SoC, and/or the like. The CPU includes 256 GB to 512 GB of system memory, accessible at a peak bandwidth of 546 GB/s. A portion of system memory included in the CPU is accessible from the PPU as an additional peer PPU destination and at high bandwidth. This portion of system memory is referred to herein as "extended GPU Memory (EGM)." EGM exhibits at least three features. First, when the PPU accesses EGM, the memory accesses are conveyed to the CPU as peer requests. Second, the peer requests from the PPU are routed to a CPU on a remote socket using high speed links at a peak bandwidth of 450 GB/s. Third, the EGM is limited to a carved-out portion of CPU memory that is disjoint from the memory used by the operating system executing on the CPU. EGM is built on top of and conforms to the existing memory model of the PP memory accessible by the PPU. As a result, threads do not have to be rewritten in order to take advantage of EGM and the corresponding performance improvements. Further, EGM is extensible to systems with multiple sockets, such that a PPU on one socket may access EGM on the same socket and/or EGM on one or more remote sockets. In such a system, sockets may be directly connected via a high-speed link. Additionally or alternatively, sockets may be connected via separate high-speed links to a high-speed switch for communications among PPUs on multiple sockets.

In some embodiments, most of the system memory included in the CPU is available as EGM, while the CPU retains a small amount of memory that includes instructions for booting and configuring the system and for managing system memory errors. In some embodiments, the majority of the system memory included in the CPU is available as EGM, while the CPU retains sufficient system memory to execute an operating system and one or more application programs. EGM accesses do not require address translation by the system memory management unit (MMU) or input/output (IOMMU). As a result, the system level memory management unit does not perform a memory address translation, thereby further reducing the time to process a memory access and increasing memory performance. Further, EGM accesses are processed by the MMU 320 on the PPU 202, where the 512 MB page size utilized by the MMU 320 on the PPU 202 is significantly larger than the page size utilized by the system level memory management unit. By using a large page size, TLB misses and associated performance penalties are reduced, relative to prior approaches.

Further, in some embodiments, the EGM may employ fabric linear addresses (FLA). When FLA addressing is used to access EGM, MMU translation on the source PPU uses FLA page tables, which may use large pages (up to 512 MB page size).

At least one technical advantage of the disclosed techniques relative to the prior art is that, with the disclosed techniques, a parallel processor executing threads has access to a large amount of memory without incurring the bandwidth penalty of paging in from and paging out to system memory. In an alternative approach, the parallel processor, such as a GPU, directly reads from and writes to system memory. This alternative approach typically requires an input/output memory management unit (IOMMU) address translation, which can lead to reduced performance. By contrast, an advantage of the disclosed technique is that memory accesses can be directed towards the memory at full link bandwidth without the overhead of IOMMU translation. As a result, threads that are highly parallelizable and access a large memory space execute with increased performance on a parallel processor relative to prior approaches. These advantages represent one or more technological improvements over prior art approaches.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method for accessing extended memory allocated within a system memory of a central processing unit, the method comprising:
receiving, at a first parallel processor that is coupled to the central processing unit, a first memory access from a second parallel processor;
determining that the first memory access is directed towards the extended memory allocated within the system memory of the central processing unit; and
transmitting the first memory access from the first parallel processor to a memory controller that is coupled to the central processing unit for processing,
wherein the extended memory is pinned in the system memory of the central processing unit for exclusive access by the second parallel processor.

2. The method of claim 1, wherein the second parallel processor includes a local memory that is separate from the extended memory.

3. The method of claim 1, wherein the second parallel processor includes a local memory that is separate from the extended memory, and wherein the extended memory has a same programming model as the local memory.

4. The method of claim 1, wherein the second parallel processor lacks a local memory, and wherein the extended memory provides a high-speed access to the system memory.

5. The method of claim 1, wherein the second parallel processor includes a local memory that is separate from the extended memory, and further comprising determining whether a second memory access is directed towards the extended memory or directed towards the local memory based on a page table entry included in a page table.

6. The method of claim 1, wherein the extended memory is included in a designated portion of the system memory, and wherein the memory controller does not perform an address translation on an address included in the first memory access when processing the first memory access.

7. The method of claim 1, wherein a first page size for accessing the extended memory is larger than a second page size for accessing the system memory.

8. The method of claim 1, wherein the first memory access is associated with a page table entry that includes a peer identifier, and wherein the peer identifier identifies a socket that includes the extended memory.

9. The method of claim 1, wherein the second parallel processor is included in a first socket and the extended memory is included in a second socket.

10. The method of claim 9, wherein an address translation associated with a second memory access identifies the second socket, and wherein a memory management unit included in the second socket determines whether the second memory access is directed towards the extended memory or towards a local memory included the second parallel processor.

11. The method of claim 1, wherein the first memory access is associated with a first virtual machine included in a plurality of virtual machines executing on the second parallel processor, and wherein each virtual machine included in the plurality of virtual machines are associated with a non-overlapping portion of the extended memory.

12. The method of claim 1, wherein an address associated with the first memory access is zero-based relative to a starting address of the extended memory.

13. A system, comprising:
a central processing unit;
a memory controller that is coupled to the central processing unit; and
a first parallel processor that is coupled to the central processing unit, and that:
receives a first memory access from a second parallel processor;
determines that the first memory access is directed towards an extended memory allocated within a system memory of the central processing unit; and
transmits the first memory access from the first parallel processor to the memory controller,
wherein the extended memory is pinned in the system memory of the central processing unit for exclusive access by the second parallel processor.

14. The system of claim 13, wherein the system further includes a local memory that is separate from the extended memory.

15. The system of claim 13, wherein the system further includes a local memory that is separate from the extended memory, and wherein the extended memory has a same programming model as the local memory.

16. The system of claim 13, wherein the system lacks a local memory, and wherein the extended memory provides a high-speed access to the system memory.

17. The system of claim 13, wherein the system further includes a local memory that is separate from the extended memory, and wherein the first parallel processor further determines whether a second memory access is directed towards the extended memory or directed towards the local memory based on a page table entry included in a page table.

18. The system of claim 13, wherein the extended memory is included in a designated portion of the system memory, and wherein the memory controller does not perform an address translation on an address included in the first memory access when processing the first memory access.

19. The system of claim 13, wherein a first page size for accessing the extended memory is larger than a second page size for accessing the system memory.

20. The system of claim 13, wherein the first memory access is associated with a page table entry that includes a peer identifier, and wherein the peer identifier identifies a socket that includes the extended memory.

21. The system of claim 13, wherein the system is included in a first socket and the extended memory is included in a second socket.

\* \* \* \* \*